United States Patent
Sixel et al.

(10) Patent No.: US 9,605,602 B2
(45) Date of Patent: Mar. 28, 2017

(54) GAS OR DUAL FUEL ENGINE

(71) Applicant: Caterpillar Motoren GmbH & Co. KG, Kiel (DE)

(72) Inventors: Eike Sixel, Kiel (DE); Adam Stubbs, Peterborough (GB); Aradhita Subirkumar Chakrabarty, Peterborough (GB); Daniel Wester, Felde (DE); Rodney Stazicker, Peterborough (GB); Michael Andrew Snopko, Peoria, IL (US); Arvind Sivasubramanian, Peoria, IL (US)

(73) Assignee: Caterpillar Motoren GmbH & Co. KG, Kiel (DE)

( * ) Notice: Subject to any disclaimer, the term of this patent is extended or adjusted under 35 U.S.C. 154(b) by 63 days.

(21) Appl. No.: 14/641,154

(22) Filed: Mar. 6, 2015

(65) Prior Publication Data

US 2015/0252738 A1    Sep. 10, 2015

(30) Foreign Application Priority Data

Mar. 10, 2014 (GB) .................................. 1404179.2

(51) Int. Cl.
*F02D 19/06* (2006.01)
*F02D 41/00* (2006.01)
*F02D 41/40* (2006.01)

(52) U.S. Cl.
CPC ..... *F02D 19/0607* (2013.01); *F02D 19/0626* (2013.01); *F02D 41/005* (2013.01);
(Continued)

(58) Field of Classification Search
CPC .. F02D 19/06; F02D 19/0607; F02D 19/0626; F02D 41/00; F02D 41/0025;
(Continued)

(56) References Cited

U.S. PATENT DOCUMENTS

| | | | |
|---|---|---|---|
| 4,936,277 A | 6/1990 | Deutsch et al. | |
| 4,979,481 A | 12/1990 | Shimomura et al. | |
| 5,249,562 A | 10/1993 | Klenk et al. | |
| 5,582,151 A | 12/1996 | Wertheimer | |
| 5,700,954 A | 12/1997 | Sinha et al. | |
| 6,105,552 A * | 8/2000 | Arisawa ............... | F02D 35/027 123/406.37 |
| 7,216,638 B1 * | 5/2007 | Burk .................. | F02D 41/0085 123/673 |
| 7,387,091 B2 | 6/2008 | Ritter | |
| 8,402,944 B2 | 3/2013 | Lorenz et al. | |
| 2006/0196486 A1 | 9/2006 | Wang et al. | |
| 2007/0215107 A1 | 9/2007 | Shelby et al. | |
| 2007/0215130 A1 | 9/2007 | Shelby et al. | |
| 2011/0239986 A1 * | 10/2011 | Shishime ............. | F02D 13/0238 123/406.29 |
| 2011/0246049 A1 * | 10/2011 | Matsuo .................. | F02D 35/02 701/111 |
| 2013/0139786 A1 | 6/2013 | Glugla et al. | |

(Continued)

FOREIGN PATENT DOCUMENTS

| | | |
|---|---|---|
| EP | 2672095 | 12/2013 |
| GB | 2479567 | 10/2011 |
| WO | 2012128791 | 9/2012 |

OTHER PUBLICATIONS

UK Search Report dated Oct. 20, 2014.

*Primary Examiner* — John Kwon
*Assistant Examiner* — Johnny H Hoang

(57) ABSTRACT

A method of operating a gas or dual fuel engine having a plurality of cylinders, includes monitoring a characteristic of each of the plurality of cylinders during operation of the gas or dual fuel engine. The method also includes detecting a pre-ignition condition associated with one or more cylinders of the plurality of cylinders based on the monitored characteristic. The method further includes reducing fuel supply to the one or more cylinders having the pre-ignition condition. The fuel supply to remaining cylinders of the plurality of cylinders is increased, to maintain a constant power output of the gas or dual fuel engine. The method further includes adjusting an amount of air supplied to each of the plurality of cylinders based on the increased amount of fuel supplied to the remaining cylinders, to maintain an air-to-fuel ratio within a desired range.

20 Claims, 3 Drawing Sheets

(52) U.S. Cl.
CPC ..... *F02D 41/0025* (2013.01); *F02D 41/0085* (2013.01); *F02D 41/0087* (2013.01); *F02D 41/401* (2013.01); *F02D 2200/0618* (2013.01); *F02D 2200/1002* (2013.01); *F02D 2250/18* (2013.01); *F02D 2250/32* (2013.01); *Y02T 10/36* (2013.01); *Y02T 10/44* (2013.01); *Y02T 10/47* (2013.01)

(58) Field of Classification Search
CPC ............ F02D 41/0085; F02D 41/0087; F02D 41/005; F02D 41/40; F02D 41/401; F02D 2200/10; F02D 2200/1002; F02D 2200/06; F02D 2200/0618; F02D 2250/18; F02D 2250/32; Y02T 10/36; Y02T 10/44
USPC ........ 123/298, 299, 305, 344, 406.2, 27 GE, 123/445, 525–527
See application file for complete search history.

(56) References Cited

U.S. PATENT DOCUMENTS

2013/0255628 A1    10/2013  Moren et al.
2013/0311064 A1*  11/2013  Suzuki .................. F02D 35/023
                                                            701/103

* cited by examiner

GAS OR DUAL FUEL ENGINE

The application claims the benefit of priority of UK Patent Application No. 1404179.2, filed Mar. 10, 2014, which is incorporated herein in its entirety by reference.

TECHNICAL FIELD

The present disclosure relates to a gas or dual fuel internal combustion engine, and more particularly to a system and method of operating the gas or dual fuel engine.

BACKGROUND

Pre-ignition may occur during an operation of an internal combustion engine. Pre-ignition is a self ignition process of a mixture of gas and/or fuel and air in a combustion chamber of the engine. Pre-ignition may occur at high-engine loads and/or high temperatures. Pre-ignition of the mixture of gas and/or fuel and air may result in very high cylinder pressures and may potentially damage the engine.

U.S. Pat. No. 4,979,481 relates to a control apparatus for an internal combustion engine having cylinders. Each of the cylinders is provided with an exclusive fuel injection valve. Each cylinder has a misfiring detecting means for detecting misfiring in that cylinder. The control apparatus includes a drive stopping means for stopping the driving of the fuel injection valve corresponding to a misfired cylinder so as to stop fuel supply to that misfired cylinder. The apparatus is further provided with an air-to-fuel ratio sensor in the exhaust path of the engine so that when misfiring of the cylinder is detected, the fuel injection valves remain controlled through a feedback control. The openings of the normally fired cylinders are controlled in accordance with the air-to-fuel ratio signal outputted from the air-to-fuel ratio sensor in such a way that the apparent air-to-fuel ratio of the cylinders is given by an equation $L=nLo/(n-p)$ where L is the apparent value of the air-to-fuel ratio of the cylinders when p cylinders are misfired, n is the number of cylinders, Lo is the air-to-fuel ratio of the cylinders when all of the cylinders are normally operating, and p is the number of misfired cylinders.

SUMMARY

In an aspect of the present disclosure, a method of operating a gas or dual fuel engine having a plurality of cylinders includes monitoring a characteristic of each of the plurality of cylinders during operation of the gas or dual fuel engine. The method detects a pre-ignition condition associated with one or more cylinders from the plurality of cylinders based on monitored characteristics of the plurality of cylinders. The method reduces fuel supply to the one or more cylinders having the pre-ignition condition associated therewith. The fuel supply to remaining cylinders from the plurality of cylinders is increased in response to the reduced fuel supply to the one or more cylinders having the pre-ignition condition in order to maintain a constant power output of the gas or dual fuel engine. The method adjusts an amount of air supplied to each of the plurality of cylinders based on the increased amount of fuel supplied to the remaining cylinders, in order to maintain an air-to-fuel ratio within a desired range.

In another aspect of the present disclosure, a gas or dual fuel engine is provided. The engine includes a number of cylinders. The engine further includes a fuel admission valve associated with each of the plurality of cylinders. The fuel admission valve is configured to supply fuel to a combustion chamber of each of the plurality of cylinders. Further, the engine includes a sensor associated with each of the plurality of cylinders and configured to detect a characteristic of each of the plurality of cylinders during an operation of the gas or dual fuel engine. Furthermore, the engine includes a control unit operatively coupled to the sensor and the fuel admission valve associated with each of the plurality of cylinders. The control unit receives at least one characteristic of each of the plurality of cylinders during operation of the gas or dual fuel engine from the sensor. Further, the control unit detects a pre-ignition condition associated with one or more cylinders from the plurality of cylinders based on the received characteristics of each of the plurality of cylinders. The control unit reduces fuel supply to the one or more cylinders having the pre-ignition condition associated therewith. The control unit increases fuel supply to remaining cylinders from the plurality of cylinders in response to the reduced fuel supply to the one or more cylinders having the pre-ignition condition in order to maintain a constant power output of the gas or dual fuel engine. Furthermore, the control unit adjusts an amount of air supplied to each of the plurality of cylinders based on the increased amount of fuel supplied to the remaining cylinders, in order to maintain an air-to-fuel ratio within a desired range.

Other features and aspects of this disclosure will be apparent from the following description and the accompanying drawings.

DETAILED DESCRIPTION

Figure 1:
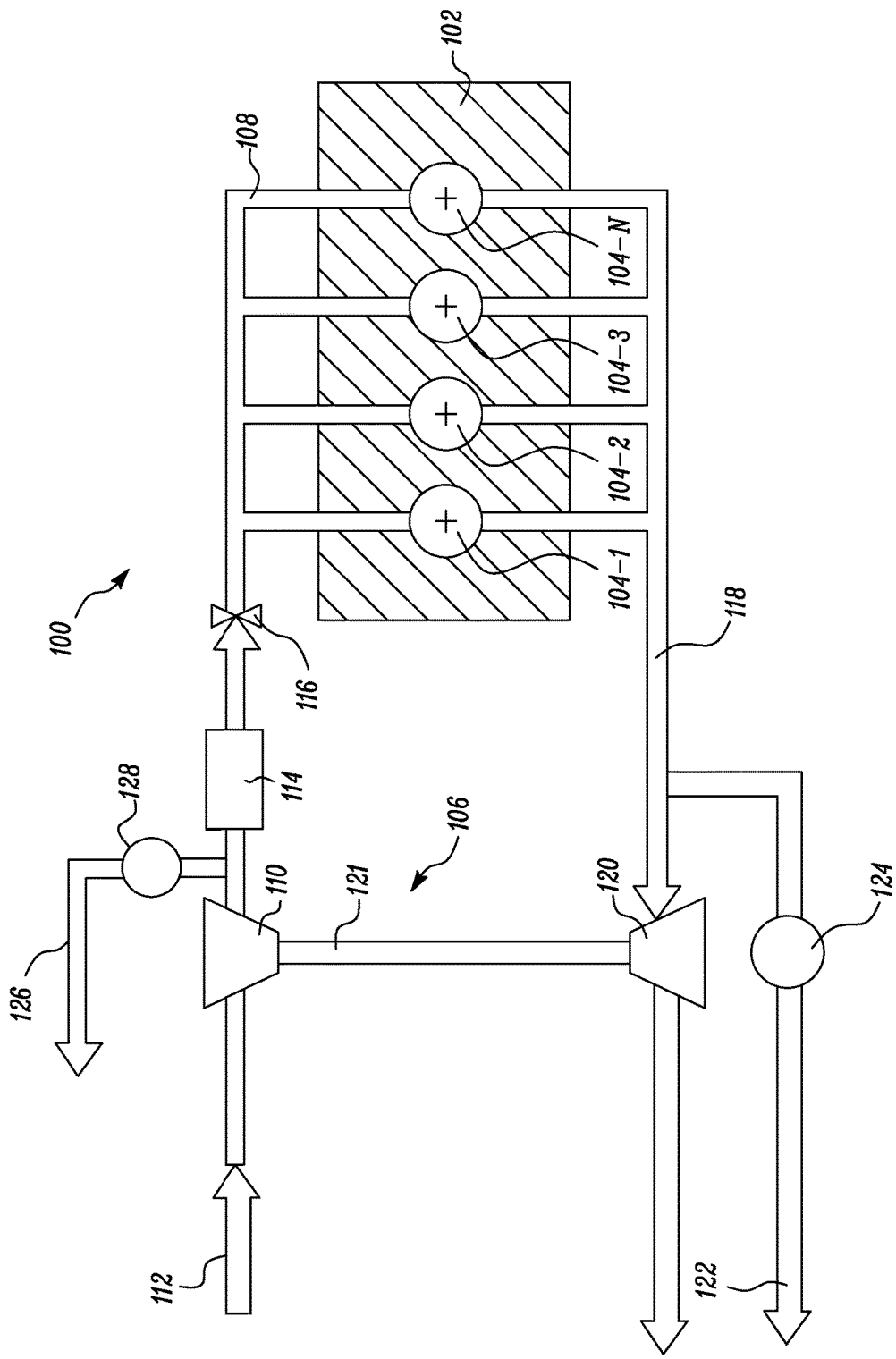
FIG. 1 illustrates a schematic representation of an exemplary engine, according to an embodiment of the present disclosure.

The present disclosure relates to a system and method for operating a gas or dual fuel engine. FIG. 1 illustrates a schematic representation of an engine 100, according to an embodiment of the present disclosure. According to an embodiment, the engine 100 is a gaseous fuel internal combustion engine system. However, in various alternative embodiments, the engine 100 may be any type of internal combustion engine, such as a dual fuel engine, Otto or compression ignition internal combustion engine. The engine 100 may utilize a gaseous and/or liquid fuel for combustion.

The engine 100 includes an engine block 102. The engine block 102 includes a bank of cylinders 104-1, 104-2, 104-3, ... 104-n, interchangeably and collectively referred to as the cylinders 104. The cylinders 104 may be made of metallic alloys such as steel, aluminium based alloys, etc. It is contemplated that the engine 100 may include any number of cylinders 104 and that the cylinders 104 may be disposed in an "in-line" configuration, a "V" configuration, or any other configuration known in the art. The engine 100 may be used to power any machine or other device, including on-highway trucks or vehicles, off-highway trucks or machines, earth moving equipment, generators, pump etc. The machines may be used in various applications, such as in aerospace applications, locomotive applications, marine applications, power generation, and other engine powered applications.

Figure 2:
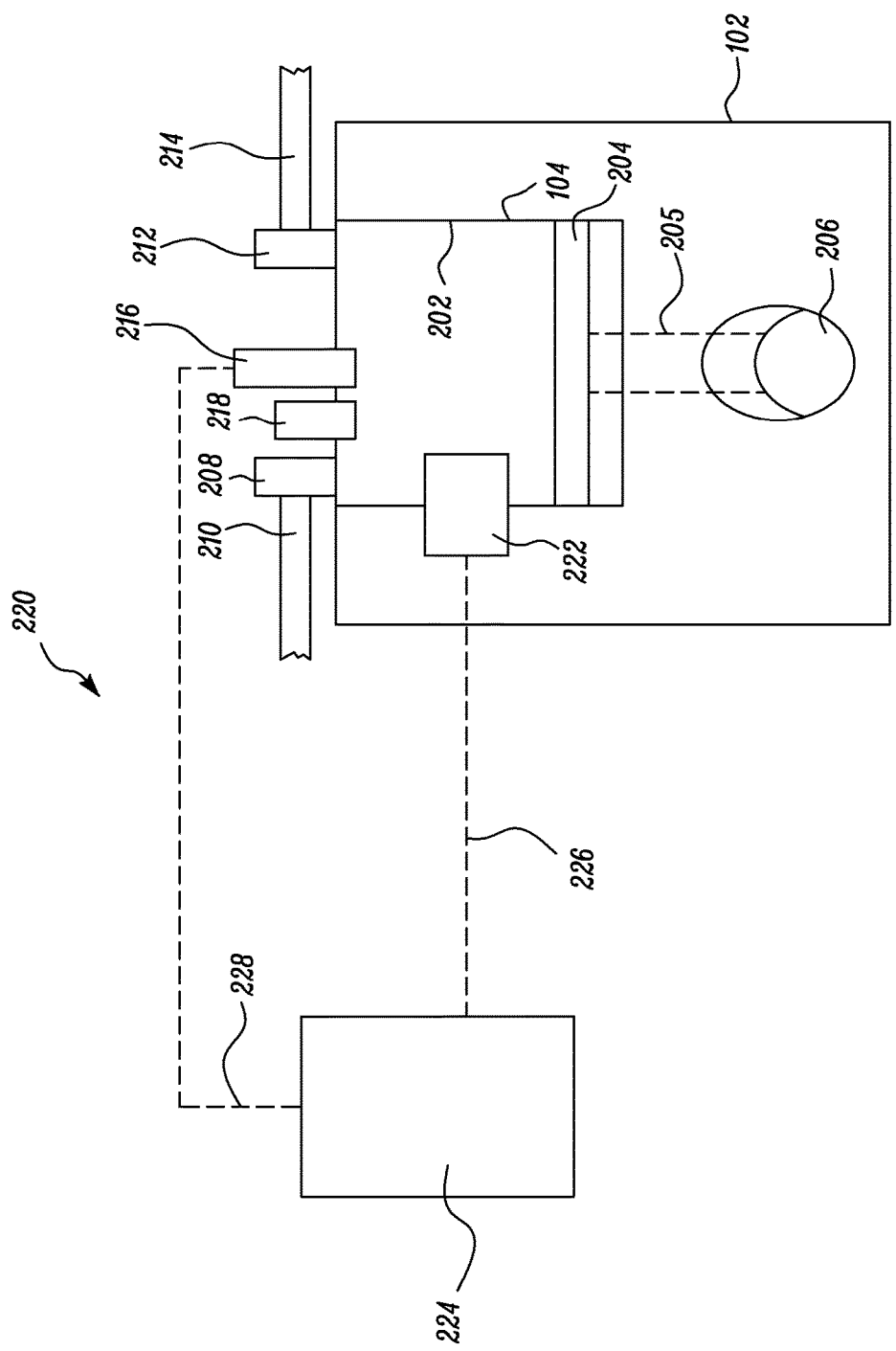
FIG. 2 illustrates a schematic view of a control system of operating the engine of FIG. 1, according to an embodiment of the present disclosure.

The engine 100 further includes a fuel tank (not shown), a turbocharger 106 associated with the cylinders 104, and an intake manifold 108. The intake manifold 108 is fluidly connected to combustion chambers 202 (as shown in FIG. 2) of each of the cylinders 104 and configured to introduce compressed air into the combustion chambers 202 of the cylinders 104. The turbocharger 106 includes a compressor 110 to receive atmospheric air via an air inlet 112, and provide compressed air to the intake manifold 108 via a cooler 114. A throttle valve 116 is located downstream of the cooler 114 and is configured to regulate the air flow between the cooler 114 and the intake manifold 108.

Further, an exhaust manifold 118 is connected to each of the cylinders 104. After combustion of the gaseous fuel in the combustion chambers 202, exhaust gases are released through the exhaust manifold 118. The turbocharger 106 further includes a turbine 120 configured to use the heat and pressure of the exhaust gases to drive the compressor 110. The compressor 110 is rotatably connected to the turbine 120 via a shaft 121 and driven by the rotational movement of the turbine 120 caused by the exhaust gases from the exhaust manifold 118.

Furthermore, the engine 100 may include a waste gate system having a waste gate connection 122 fluidly connected to the exhaust manifold 118 via a waste gate valve 124. The waste gate system may be configured to regulate the speed of the turbine 120. Additionally, the engine 100 may include a bypass system having a bypass connection 126 configured to release the excess compressed air into atmosphere via a bypass valve 128.

FIG. 2 illustrates a schematic view of a control system 220 of operating the engine of FIG. 1. For the sake of simplicity in explanation, only one cylinder 104 is shown in FIG. 2. As shown in FIG. 2, the engine block 102 includes the cylinder 104 defining the combustion chamber 202 and includes a piston 204 adapted to reciprocate therein. The engine block 102 further includes a crankshaft 206 supported within a crankcase (not shown) and connected to the piston 204 via a piston rod 205.

The engine 100 further includes an inlet valve 208 associated with each of the cylinders 104. The inlet valve 208 is configured to regulate a fluid flow between an intake passage 210 and the combustion chamber 202 of the cylinder 104. It may be contemplated that the cylinder 104 is connected to the intake manifold 108 (as shown in FIG. 1) via the intake passage 210 and the inlet valve 208. The inlet valve 208 is configured to supply compressed intake air to the combustion chamber 202.

The engine 100 further includes an exhaust valve 212 associated with each of the cylinder 104. The exhaust valve 212 is configured to regulate fluid flow between an exhaust passage 214 and the combustion chamber 202 of the cylinder 104. It may be contemplated that the cylinder 104 is connected to the exhaust manifold 118 (shown in FIG. 1) via the exhaust passage 214 and the exhaust valve 212. Although, only one inlet valve 208 and one exhaust valve 212 is shown in FIG. 2, it may be well understood that the number of inlet and exhaust valves 208, 212 may be varied without deviating from the scope of the claimed subject matter.

Further, the engine 100 includes a fuel admission valve 216 associated with each of the cylinders 104. The fuel admission valve 216 may be configured to supply fuel to the combustion chamber 202. In an exemplary embodiment, the fuel admission valve 216 may be a gas admission valve configured to supply gaseous fuel to the combustion chamber 202 or to the intake passage 210 associated with each of the cylinder 104.

Further, the engine 100 includes an ignition device 218 configured to ignite a mixture of fuel and air inside the combustion chamber 202 at a desired ignition timing. In an exemplary embodiment, the ignition device 218 is a spark plug. Alternatively, the ignition device 218 may be a pilot injector in case of a dual fuel engine, and is configured to inject a pilot amount of fuel, such as diesel to ignite the mixture. The ignition timing or the injection timing for the respective cylinder 104 will be hereinafter referred to as Start of Ignition (SOI) for that respective cylinder 104.

In an embodiment of the present disclosure, a control system 220 is provided for each of the cylinders 104 in the engine 100. The control system 220 includes a sensor 222 associated with each of the cylinder 104. The sensor 222 is disposed at least partly within the combustion chamber 202 of the respective cylinders 104. The sensor 222 is configured to detect a characteristic of the respective cylinder 104 during an operation of the engine 100. In an embodiment, the sensor 222 is a pressure sensor configured to detect an in-cylinder pressure of the cylinder 104. Alternatively, the sensor 222 may be a combustion sensor configured to detect a flame front of combustion in the cylinder 104, a temperature sensor configured to detect temperature fluctuations within the combustion chamber 202, and the like.

Further, a communication link 226 connects a control unit 224 and the sensor 222, and a communication link 228 connects the control unit 224 with the fuel admission valve 216. Furthermore, the control unit 224 may be connected to the ignition device 218 and may be configured to control the SOI of the mixture within the combustion chamber 202 by controlling the ignition device 218. The control unit 224 may also be configured to control an operation of various components of the engine 100. In an exemplary embodiment, the control unit 224 may be a single controller, such as the machine electronic control module (ECM) connected to all the sensors 222 of respective cylinders 104. The control unit 224 may include a central processing unit, a memory, and an input/output circuit that facilitates communication to various components of the engine 100. The control unit 224 may control operation by executing operating instructions, such as, for example, computer readable program code stored in memory. The operations may be initiated automatically or based on an external input. Various other components may be associated with the control unit 224, such as power supply circuitry, signal processing circuitry, communication circuitry, and so on.

The control unit 224 is configured to receive an output signal from the sensor 222 indicative of the detected characteristic of the cylinder 104. The control unit 224 may determine a Start of Combustion (SOC) of the mixture of fuel and air in the combustion chamber 202 during the operation of the engine 100 based on the received characteristic of the cylinder 104 from the sensor 222. The control unit 224 may be configured to store and analyze the in-cylinder pressure measurement as detected by the sensor 222 to determine the SOC in the combustion chamber 202. In an exemplary embodiment, the control unit 224 may determine the SOC when the measured in-cylinder pressure in the combustion chamber 202 is greater than a first threshold pressure. For example, the first threshold pressure may also be stored within a memory module (not shown) of the control unit 224.

The control unit 224 includes the memory module known in the art for storing data related to the operation of the engine 100 and its components. The data may be stored in the form of one or more engine maps. The engine maps may also include relation between the detected characteristics from the sensor 222 and the SOC in the combustion chamber 202. The engine maps may be in the form of tables, graphs and/or equations, and may include a compilation of data collected from lab and/or field operation of the engine 100. It may be contemplated that these engine maps may be generated by performing instrumented tests on the operation of the engine 100 under various operating conditions while varying parameters associated therewith or performing various measurements. The control unit 224 may refer to these engine maps and control operation of the one or more components of the engine 100.

In an embodiment of the present disclosure, the control unit 224 is configured to detect a pre-ignition condition associated with one or more cylinders 104 within the engine 100. For example, the control unit 224 is configured to determine a time difference between the start of combustion (SOC) and the start of ignition or injection (SOI) for the cylinder 104. It may be contemplated that the pre-ignition condition may be characterized by a quick movement of the SOC towards the SOI. This means that, when the pre-ignition condition begins to occur, the time difference between the SOC and the SOI is reduced and when the start of combustion (SOC) occurs before the start of ignition (SOI), then a complete pre-ignition condition is detected for that cylinder 104. The control unit 224 may use the detected characteristics from the sensor 222 to determine the Start of combustion (SOC) timing for that cylinder 104 by using the engine maps. Alternatively, the control unit 224 may receive the SOC timing from the sensor 222, where the sensor 222 may determine the SOC timing using the detected characteristics. Further, the control unit 224 is configured to compare the SOC timing with the SOI timing to detect the pre-ignition condition for that cylinder 104. In an exemplary embodiment, a crank angle at which the SOC occurs may be compared to a crank angle at which the SOI is to occur for a given cylinder 104, and the difference between the crank angles may correspond to the time difference.

Further, the control unit 224 is configured to reduce a fuel supply to each of the cylinders 104 having the pre-ignition condition associated therewith. A corresponding engine map may also be stored which may define a relation between the adjustment of the fuel supply and the time difference between the SOC and the SOI for each of the cylinders 104. The control unit 224 may refer to this engine maps for determining the amount of fuel supply to be reduced corresponding to the pre-ignition condition and based on the time difference between the SOC and the SOI for the cylinders 104. Therefore, when the time difference between the SOC and the SOI is less than a predetermined threshold, then the pre-ignition condition is detected and corresponding to this time difference, the fuel supply to the corresponding cylinder 104 is reduced by the control unit 224. Also, for different values of the time difference between the SOC and the SOI, the reduced fuel supply may be varied from less reduced fuel supply to larger reduced fuel supply to the cylinders 104. For example, when the time difference is very less, then larger amount of fuel supply is reduced, and similarly, when the time difference is large but less than the predetermined threshold, then a lesser amount of fuel may be reduced for the corresponding cylinder 104.

In an exemplary embodiment, the control unit 224 may reduce an opening duration of the fuel admission valve 216 to reduce the fuel supply to the corresponding cylinder 104. Alternatively, the control unit 224 may control an extent of opening of the fuel admission valve 216 to reduce the fuel supply to the corresponding cylinders 104. The engine maps may also include a relation between the opening duration and/or the extent of opening of the fuel admission valve 216 to the time difference between the SOC and the SOI for the cylinders 104.

Furthermore, in response to the reduced fuel supply to the one or more cylinders 104 with pre-ignition condition, the fuel supply is increased to the remaining cylinders 104 in the engine 100 that are unaffected and operate normally. For example, if among the cylinders 104-1, 104-2, 104-3, . . . **104-*n*, only one cylinder 104-2 has pre-ignition condition, then the fuel supply to the cylinder 104-2 will be reduced and the fuel supply to the remaining cylinders 104-1, 104-3, . . . 104-*n* will be increased accordingly. In an exemplary embodiment, an engine map may be defined to define a relation between the reduced amount of fuel and the correspondingly increased amount of fuel to be supplied to the cylinders 104. In an exemplary embodiment, the relation between the reduced amount of fuel and the increased amount of fuel to be supplied to the effected and the unaffected cylinders 104 respectively may be further dependent on a desired power output of the engine 100. For example, reduced fuel supply to the affected cylinders 104 having the pre-ignition condition may produce low power output. Therefore, in order to maintain constant power output of the engine 100, the power output of the unaffected cylinders 104 may be increased by accordingly increasing the fuel supply to these cylinders 104. The control unit 224 may refer to these engine maps to determine the amount of fuel to be increased in response to the reduced amount of fuel supplied to the cylinders 104** with pre-ignition condition.

In an embodiment, the control unit 224 may increase an opening duration of the fuel admission valve 216 to increase the fuel supply to the remaining cylinders 104 in the engine 100. In an alternative embodiment, the control unit 224 may increase an extent of opening of the fuel admission valve 216 to increase the fuel supply to the remaining cylinders in the engine 100.

Furthermore, the control unit 224 is configured to increase an amount of air supplied to all the cylinders in the engine 100 based on the increased amount of fuel supplied to the remaining cylinders 104 to maintain an air-to-fuel ratio within a desired range for the unaffected remaining cylinders 104 in the engine 100. In an exemplary embodiment, the desired range of air-to-fuel ratio may be from about 33:1 to 38:1. Alternatively, the desired range of air-to-fuel ratio for the remaining cylinders may be varied based on a number of factors such as engine calibration, decreased amount of fuel in the one or more cylinders 104 having the pre-ignition condition, etc.

It may be contemplated, that an air-to-fuel ratio will increase in the one or more cylinders 104 having the pre-ignition condition, resulting in a lean air fuel mixture in the corresponding combustion chamber 202. Therefore, less amount of fuel results in a decreased power output of the one or more cylinder 104 having the pre-ignition condition. Whereas, for the unaffected remaining cylinders 104, the air-to-fuel ratio is maintained constant, having a higher amount of fuel and correspondingly higher amount of air. Therefore, high amount of fuel result in an increased power output for the corresponding remaining cylinders 104. The decreased power output of the one or more cylinders 104 having the pre-ignition condition is compensated by the increased power output of the remaining cylinders 104 in order to maintain the constant power output of the engine 100.

INDUSTRIAL APPLICABILITY

The industrial applicability of the control system 220 for operating the engine 100 will be readily understood from the foregoing discussion. The control system 220 is configured to prevent pre-ignition in a gas or dual fuel internal combustion engine 100.

Figure 3:
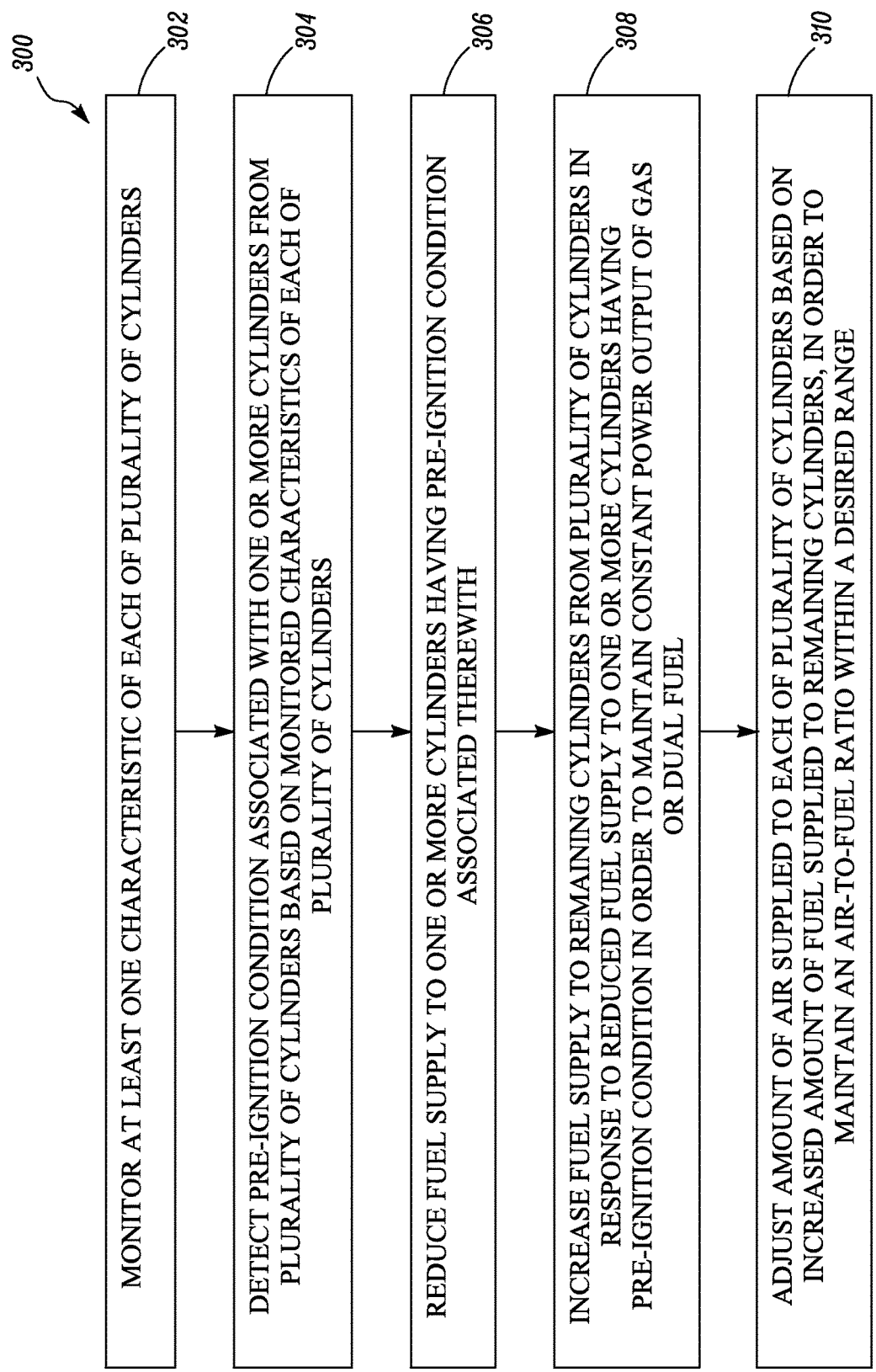
FIG. 3 illustrates an exemplary method of operating the engine, according to an embodiment of the present disclosure.

FIG. 3 illustrates a flowchart for an exemplary method of operating the engine 100, according to an embodiment of the present disclosure. At step 302, the control unit 224 may monitor one or more of characteristics associated with the cylinders 104 during the operation of the engine 100. The sensor 222 detects the characteristic, such as in-cylinder pressure, temperature, etc., associated with each of the cylinders 104.

At step 304, the control unit 224 detects the pre-ignition condition associated with one or cylinders 104 within the engine 100. The control unit 224 may detect the SOC of the cylinder 104 and determines a time difference between the SOC and the SOI of the cylinder 104. The control unit 224 may detect the pre-ignition condition if the time difference between the SOC and the SOI is less than the predetermined threshold.

In case, the control unit 224 detects the pre-ignition condition with one or more cylinders 104, the control unit 224 may reduce fuel supply to the corresponding cylinders 104, at step 306. For example, the control unit 224 may reduce the opening duration of the fuel admission valve 216 and/or the extent of opening of the fuel admission valve 216. As the fuel supply to the one or more cylinders 104 having pre-ignition condition associated therewith decreases, the power output of these one or more cylinders 104 reduces.

In response to the reduced fuel supply to the one or more cylinders 104, the control unit 224 may accordingly increase the fuel supply to the remaining cylinders 104 at step 308. The control unit 224 may increase the opening duration and/or the extent of opening of the fuel admission valve 216 of the corresponding remaining cylinders 104. The increased fuel supply to the remaining cylinders 104 in the engine 100 may increase the power output of these cylinders 104, such that these remaining cylinders 104 compensate for the reduced power output of the cylinders 104 having the pre-ignition condition, in order to maintain the constant power output of the engine 100.

Further, at step 310, the control unit may adjust the amount of air supplied to each of the cylinders 104 based on the increased amount of fuel supplied to the remaining cylinders 104. For example, the control unit 224 may increase the amount of air supplied to all the cylinders in the engine 100 to maintain the air-to-fuel ratio within a desired range for the unaffected remaining cylinders 104 in the engine 100. The desired range of the air-to-fuel ratio may be from about 33:1 to 38:1.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method of operating an engine comprising a plurality of cylinders, the method comprising:
   monitoring a characteristic of each of the plurality of cylinders during operation of the engine;
   detecting a pre-ignition condition associated with one or more cylinders of the plurality of cylinders based on the monitored characteristic;
   supplying a reduced amount of fuel to the one or more cylinders having the pre-ignition condition;
   supplying an increased amount of the fuel to remaining cylinders of the plurality of cylinders, to maintain a constant power output of the engine; and
   adjusting an amount of air supplied to each of the plurality of cylinders based on the increased amount of the fuel supplied to the remaining cylinders, to maintain an air-to-fuel ratio in the remaining cylinders within a predetermined range.

2. The method of claim 1, wherein the predetermined range of air-to-fuel ratio is from 33:1 to 38:1.

3. The method of claim 1, wherein monitoring the characteristic of each of the plurality of cylinders comprises monitoring a cylinder pressure of each of the plurality of cylinders.

4. The method of claim 1, wherein detecting the pre-ignition condition further comprises:
   determining a start of combustion in each of the plurality of cylinders based on the monitored characteristic; and
   determining a time difference between the start of combustion and an ignition timing associated with each of the plurality of cylinders.

5. The method of claim 4, wherein the engine comprises a plurality of fuel admission valves with each of the plurality of fuel admission valves being associated with each of the plurality of cylinders respectively and configured to supply the fuel to a combustion chamber of the associated cylinder, and supplying the increased amount of the fuel to the remaining cylinders of the plurality of cylinders further comprising:
   increasing an opening duration of the fuel admission valves associated with the remaining cylinders when the time difference between the start of combustion and the ignition timing is less than a predetermined threshold for the one or more cylinders.

6. The method of claim 1, wherein the engine comprises a pilot injector configured to inject a pilot fuel into a combustion chamber of each of the plurality of cylinders, the method further comprising:
   determining a time difference between a start of combustion and a start of injection of pilot fuel by the pilot injector.

7. The method of claim 6, wherein the engine comprises a plurality of fuel admission valves with each of the plurality of fuel admission valves being associated with each of the plurality of cylinders respectively and configured to supply the fuel to a combustion chamber of the associated cylinder, the method further comprising:
   increasing an opening duration of the gas admission valves associated with the remaining cylinders when the time difference between the start of combustion and the start of injection of pilot fuel is less than a predetermined threshold for the one or more cylinders.

8. The method of claim 1, wherein the engine comprises a plurality of fuel admission valves with each of the plurality of fuel admission valves being associated with each of the plurality of cylinders respectively and configured to supply the fuel to a combustion chamber of the associated cylinder, and supplying the reduced amount of the fuel to the one or more cylinders having the pre-ignition condition further comprising:

reducing an opening duration of the fuel admission valves associated with the one or more cylinders.

9. An engine comprising:
a plurality of cylinders;
a plurality of fuel admission valves, each of the plurality of fuel admission valves being associated with each of the plurality of cylinders respectively and configured to supply fuel to a combustion chamber of the associated cylinder;
a plurality of sensors, each of the plurality of sensors being associated with each of the plurality of cylinders respectively and configured to monitor a characteristic of the associated cylinder; and
a control unit operatively coupled to the plurality of sensors and the plurality of fuel admission valves, the control unit being configured to:
receive a characteristic of each of the plurality of cylinders from the plurality of sensors;
detect a pre-ignition condition associated with one or more cylinders of the plurality of cylinders based on the received characteristic;
supply a reduced amount of the fuel to the one or more cylinders having the pre-ignition condition;
supply an increased amount of the fuel to remaining cylinders of the plurality of cylinders, to maintain a constant power output of the engine; and
adjust an amount of air supplied to each of the plurality of cylinders based on the increased amount of the fuel supplied to the remaining cylinders, to maintain an air-to-fuel ratio in the remaining cylinders within a predetermined range.

10. The engine of claim 9, wherein the control unit is configured to supply a reduced amount of the fuel to the one or more cylinders having the pre-ignition condition by reducing an opening duration of the fuel admission valves associated with the one or more cylinders.

11. The engine of claim 9, wherein the predetermined range of air-to-fuel ratio is from 33:1 to 38:1.

12. The engine of claim 9, wherein each of the plurality of sensors is a pressure sensor configured to detect a cylinder pressure of the associated cylinder.

13. The engine of claim 9, wherein the control unit is configured to detect the pre-ignition condition by:
determining a start of combustion in each of the plurality of cylinders based on the received characteristic; and
determining a time difference between the start of combustion and an ignition timing associated with each of the plurality of cylinders.

14. The engine of claim 13, wherein the control unit is configured to supply the increased amount of the fuel to the remaining cylinders by increasing an opening duration of the fuel admission valves associated with the remaining cylinders when the time difference between the start of combustion and the ignition timing is less than a predetermined threshold for the one or more cylinders.

15. The engine of claim 9, further comprising a pilot injector configured to inject a pilot fuel into the combustion chamber of each of the plurality of cylinders.

16. The engine of claim 15, wherein the control unit is configured to determine a time difference between a start of combustion and a start of injection of pilot fuel by the pilot injector.

17. The engine of claim 16, wherein the control unit is further configured to increase an opening duration of the gas admission valves associated with the remaining cylinders when the time difference between the start of combustion and the start of injection of pilot fuel is less than a predetermined threshold for the one or more cylinders.

18. A control unit for controlling the operation of an engine, wherein the engine comprises a plurality of cylinders, a plurality of sensors associated with each of the cylinders and configured for determining a characteristic of each of the cylinders, and a plurality of fuel admission valves associated with each of the cylinders and configured for supplying fuel to each of the cylinders, the control unit being configured to:
receive a characteristic of each of the plurality of cylinders from the plurality of sensors;
detect a pre-ignition condition associated with one or more cylinders of the plurality of cylinders based on the received characteristic;
supply a reduced amount of the fuel to the one or more cylinders having the pre-ignition condition by controlling fuel admission valves associated with each of the one or more cylinders;
supply an increased amount of the fuel supply to remaining cylinders of the plurality of cylinders to maintain a constant power output of the engine by controlling fuel admission valves associated with the remaining cylinders; and
adjust an amount of air supplied to each of the plurality of cylinders based on the increased amount of the fuel supplied to the remaining cylinders, to maintain an air-to-fuel ratio within a desired range.

19. The control unit of claim 18, wherein the control unit is further configured to detect the pre-ignition condition by:
determining a start of combustion in each of the plurality of cylinders based on the received characteristic; and
determining a time difference between the start of combustion and an ignition timing associated with each of the plurality of cylinders.

20. The control unit of claim 19, wherein the control unit is further configured to supply the increased amount of the fuel to the remaining cylinders by increasing an opening duration of the fuel admission valves associated with the remaining cylinders when the time difference between the start of combustion and the ignition timing is less than a predetermined threshold for the one or more cylinders.

* * * * *